US 8,122,325 B2

(12) United States Patent
Effenberger

(10) Patent No.: US 8,122,325 B2
(45) Date of Patent: Feb. 21, 2012

(54) FORWARD ERROR CORRECTION FOR 64B66B CODED SYSTEMS

(75) Inventor: Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 1120 days.

(21) Appl. No.: 11/765,637

(22) Filed: Jun. 20, 2007

(65) Prior Publication Data

US 2008/0040643 A1 Feb. 14, 2008

Related U.S. Application Data

(60) Provisional application No. 60/822,175, filed on Aug. 11, 2006.

(51) Int. Cl.
*H03M 13/00* (2006.01)
(52) U.S. Cl. .................. 714/775; 714/786; 714/800
(58) Field of Classification Search .............. 714/775, 714/786, 751, 708, 774, 752, 800
See application file for complete search history.

(56) References Cited

U.S. PATENT DOCUMENTS

| 5,828,677 | A | 10/1998 | Sayeed et al. |
| 6,868,514 | B2 | 3/2005 | Kubo et al. |
| 7,383,486 | B1 * | 6/2008 | Castagna et al. ............ 714/786 |
| 2002/0109876 | A1 | 8/2002 | Eijk et al. |
| 2003/0188248 | A1 | 10/2003 | Kauschke et al. |
| 2005/0149822 | A1 | 7/2005 | Lee et al. |
| 2007/0064707 | A1 | 3/2007 | Pandel et al. |
| 2007/0157060 | A1 * | 7/2007 | Ganga et al. ............ 714/752 |
| 2008/0022181 | A1 * | 1/2008 | Belogolovy et al. ......... 714/751 |
| 2008/0065971 | A1 * | 3/2008 | Betts .......................... 714/800 |

FOREIGN PATENT DOCUMENTS

| CN | 1656692 A | 8/2005 |
| CN | 1787385 A | 6/2006 |
| JP | 9219685 A | 8/1997 |
| JP | 2002344361 A | 11/2002 |
| JP | 2006014228 A | 1/2006 |
| WO | 2005050901 A1 | 6/2005 |

OTHER PUBLICATIONS

Foreign Communication From a Related Counterpart Application—International Search Report and Written Opinion, PCT/CN2007/070410, Nov. 1, 2007, 11 pages.
Foreign Communication From a Related Counterpart Application, Chinese Application 200780019402.4, Partial English Translation of Chinese Office Action dated Mar. 23, 2011, 6 pages.

(Continued)

*Primary Examiner* — Fritz Alphonse
(74) *Attorney, Agent, or Firm* — Conley Rose, P.C.; Stephen R. Loe

(57) ABSTRACT

A network component comprising a processor configured to implement a method that comprises applying a forward error correction (FEC) algorithm to a plurality of data blocks to generate a plurality of redundancy data, encapsulating an integer number of the data blocks and the redundancy data in an FEC codeword, and transmitting the FEC codeword, wherein the codeword is about evenly aligned with a transmission clock time quanta to have a transmission rate. A method comprising selecting an FEC algorithm that generates a plurality of redundancy data from a plurality of data blocks, selecting an EEC codeword that encapsulates an integer number of the data blocks, and selecting a synchronization pattern to add to the FEC codeword such that an integer number of the FEC codewords are evenly aligned with an integer number of transmission clock time quanta.

21 Claims, 4 Drawing Sheets

OTHER PUBLICATIONS

Foreign Communication From a Related Counterpart Application, Chinese Application 200780019402.4, Office Action dated Mar. 23, 2011, 6 pages.

Foreign Communication From a Related Counterpart Application, Japanese Application 2009-523142, Office Action dated Sep. 6, 2011, 3 pages.

Foreign Communication From a Related Counterpart Application, Japanese Application 2009-523142, English Translation of Office Action dated Sep. 6, 2011, 4 pages.

Effenberger, F., et al., "10 Gb/s PMD Considerations," Huawei Technologies, Jul. 2006, 13 pages.

Mandin, J., "Framing for Forward Error Correction in 10G EPON," 802.3 10G EPON Study Group, Jul. 2006, 13 pages.

* cited by examiner

FORWARD ERROR CORRECTION FOR 64B66B CODED SYSTEMS

CROSS-REFERENCE TO RELATED APPLICATIONS

This application claims priority to U.S. Provisional Application Ser. No. 60/822,175, filed Aug. 11, 2006 by Frank J. Effenberger and entitled "FEC for 64b-66b Coded Systems" which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In telecommunications, forward error correction (FEC) is a system of data transmission error control, whereby the sender adds redundant data to the original user data that allows the receiver to detect transmission errors. An FEC system may correct the transmission errors within certain limits without asking the sender to retransmit the data. This advantage is achieved at the cost of higher bandwidth requirements for data transmission, and therefore FEC is generally only applied in situations where retransmissions are undesirable, relatively costly, or impossible.

It is a relatively recent development that 10 Gigabit (10 G) Ethernet technology is used in the passive optical network (PON) deployment, known as EPON. EPON takes advantage of the widely deployed Internet Protocol (IP) network and the maturity of the 10 G optical network technology. To improve the transmission quality and to meet the service quality demand for the "last-mile" customers, there is a need for an efficient FEC system that takes into consideration the network and traffic characteristics of 10 G EPON.

SUMMARY

In a first embodiment, the present disclosure includes a network component comprising a processor configured to implement a method that comprises applying a FEC algorithm to a plurality of data blocks to generate a plurality of redundancy data, encapsulating an integer number of the data blocks and the redundancy data in an FEC codeword, adding a synchronization pattern to the FEC codeword, and transmitting the FEC codeword, wherein the codeword is about evenly aligned with a transmission clock time quanta to have a transmission rate.

In a second embodiment, the present disclosure includes a method that comprises selecting an FEC algorithm that generates a plurality of redundancy data from a plurality of data blocks, selecting an FEC codeword that encapsulates an integer number of the data blocks, and selecting a synchronization pattern to add to the FEC codeword such that an integer number of the FEC codewords are evenly aligned with an integer number of transmission clock time quanta.

In a third embodiment, the present disclosure includes a PON component comprising a FEC module coupled to a transmitter and a receiver, wherein the FEC module is configured to generate an FEC codeword that encapsulates an integer number of data blocks and promotes the alignment of an integer number of FEC codewords with an integer number of a transmission clock time quanta.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Described herein is a method for FEC in 64b66b coded systems. The method may use the Reed-Solomon (RS) algorithm to create redundancy data, encapsulate the redundancy data and an integer number of data blocks into a codeword, and add a synchronization pattern to the codeword. This process may be implemented such that an integer number of codewords are evenly aligned with an integer number of the multiple point control protocol (MPCP) transmission clock time quanta. Such an embodiment achieves a low coded line rate, which results in lower overhead and greater efficiency. The method may also use the RS algorithm and the synchronization pattern to disassemble the codewords, and identify and correct the errors that may have occurred during the transmission.

Figure 1:
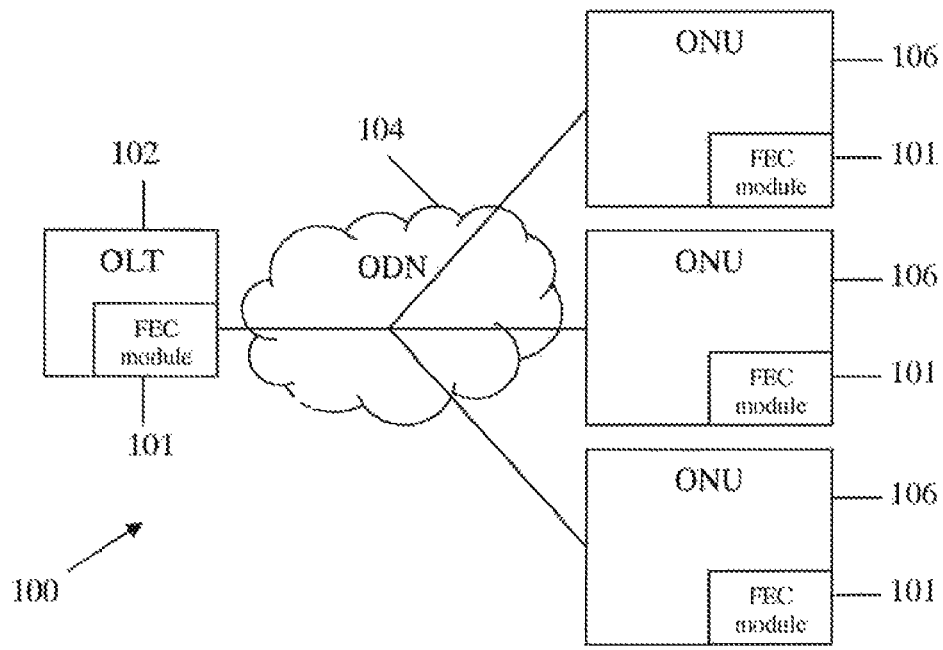
FIG. 1 illustrates one embodiment of a PON system.

FIG. 1 illustrates one embodiment of a PON 100. The PON 100 comprises an optical line terminal (OLT) 102, an optical distribution network (ODN) 104, and a plurality of optical network units (ONUs) 106. The PON 100 is a communications network that does not require any active components to distribute data between the OLT 102 and the ONUs 106. Instead, the PON 100 uses the passive optical components in the ODN 104 to distribute data between the OLT 102 and the ONUs 106. Examples of suitable PONs 100 include the asynchronous transfer mode PON (APON) and the broadband PON (BPON) defined by the ITU-T G.983 standard, the Gigabit PON (GPON) defined by the ITU-T G.984 standard, the EPON defined by the IEEE 802.3ah standard, and the wavelength division multiplexing PON (WDM-PON), all of which are incorporated by reference as if reproduced in their entirety.

One component of the PON 100 may be the OLT 102. The OLT 102 may be any device that is configured to communicate with the ONUs 106 and another network (not shown). Specifically, the OLT 102 may act as an intermediary between the other network and the ONUs 106 in that the OLT 102 forwards data received from the network to the ONUs 106, and forwards data received from the ONUs 106 onto the other network. The OLT 102 described herein is typically located at a central location, such as a central office, but may be located at other locations as well.

Another component of the PON 100 may be the ONUs 106. The ONUs 106 may be any devices that are configured to communicate with the OLT 102 and a customer or user (not shown). Specifically, the ONUs may act as an intermediary between the OLT 102 and the customer in that the ONUs 106 forward data received from the OLT 102 to the customer, and forward data received from the customer onto the OLT 102. In some embodiments, ONUs 106 and optical network terminals (ONTs) are similar, and thus the terms are used interchangeably herein. The ONUs are typically located at distributed locations, such as the customer premises, but may be located at other locations as well.

Another component of the PON 100 may be the ODN 104. The ODN 104 is a data distribution system comprised of optical fiber cables, couplers, splitters, distributors, and/or other equipment known to persons of ordinary skill in the art. In an embodiment, the optical fiber cables, couplers, splitters, distributors, and/or other equipment known to persons of ordinary skill in the art are passive optical components. Specifically, the optical fiber cables, couplers, splitters, distributors, and/or other equipment known to persons of ordinary skill in the art may be components that do not require any power to distribute data signals between the OLT 102 and the ONUs 106. The ODN 104 typically extends from the OLT 102 to the ONUs 106 in a branching configuration as shown in FIG. 1, but may be alternatively configured as determined by a person of ordinary skill in the art.

Another component of the PON may be a FEC module 101. The FEC module is a transmission error control system that may comprise both hardware and software subcomponents. The FEC module may have a sender part and a receiver part, and the two parts may work together to achieve the error correction. The sender part may use an FEC algorithm to generate redundancy data from the original data blocks, and may send the redundancy data and the original data blocks to the intended recipient. The receiver part may use the same or a similar algorithm to generate its version of the redundancy data. A discrepancy between the two versions of the redundancy data indicates a transmission error. In such a case, the receiver part of the FEC module may use the redundancy data to correct the error and recover the original data blocks. The FEC module may be implemented in a hardware module, a software module, or combinations thereof.

Figure 2:
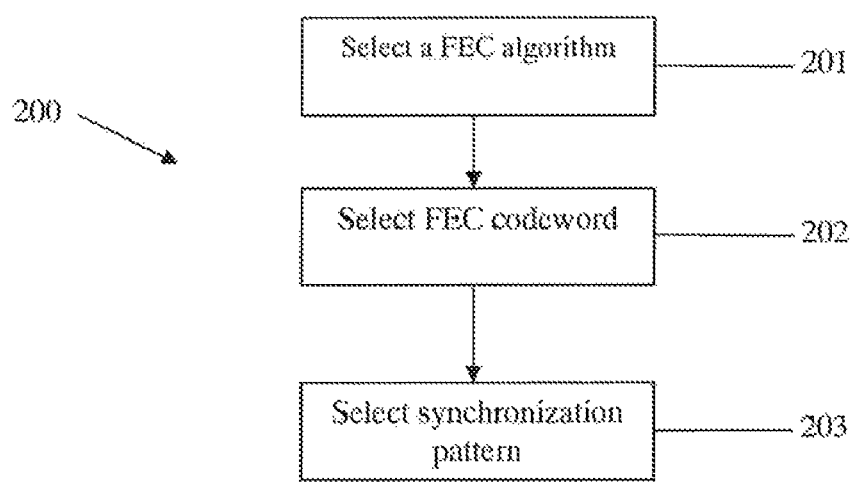
FIG. 2 is a flowchart of one embodiment of a process for configuring a FEC module.

FIG. 2 illustrates one embodiment of a process 200 for configuring the FEC module. The process 200 may include selecting an FEC algorithm at 201, selecting an FEC codeword at 202, and selecting a synchronization pattern at 203. The process 200 may be used to configure the FEC module for a sender, a recipient, or both. The number and the order of the blocks represent only one embodiment, and the process 200 should not be limited to the number and order described herein.

The process 200 may begin by selecting an FEC algorithm at 201. The selection of the FEC algorithm may be based on various factors, such as the size of the data blocks that the FEC algorithm will process, the range of sizes of data blocks the FEC algorithm may accommodate, and the size of the codeword, among others. The selected FEC algorithm may accommodate the data blocks of at least one line coding format and preferably multiple line coding formats in order to accommodate different transmission technologies. In one embodiment, the RS algorithm is selected as the FEC algorithm. The RS algorithm generates many polynomial data points as redundancy data. As long as a sufficient number of the polynomial data points are received correctly, the receiver can recover any original data blocks using the polynomial data points, even in the presence of a few bad data points.

As part of selecting an FEC algorithm, the length of the redundancy data is also decided. The length of the redundancy data is a design choice and may vary from one implementation to another. For example, one bit of redundancy data may be generated for 4 bits, 8 bits, 16 bits, or 32 bits of data, depending on the implementation. A large amount of redundancy data yields a strong error-correcting capability, but at a cost of extra bandwidth. The specific length of redundancy data depends on the anticipated error rate, type of errors and traffic patterns. For example, if the anticipated error rate is low, then fewer redundancy data may be needed to achieve the desired error correction capability. The length of redundancy data may also be configurable to accommodate different traffic and network conditions, according to one embodiment. For a traffic pattern with a large number of data errors anticipated, redundancy data of a longer length may be appropriate. Otherwise, the length may be shorter in the interests of saving data bandwidth. An FEC module with configurable redundancy data may be deployable to network devices in diverse operating conditions.

The process 200 may continue with the selection of an FEC codeword at 202. The size of the FEC codeword may be selected such that the FEC codeword contain a maximum number of data blocks without fragmenting any of the data blocks. In one embodiment, the RS (239, 255) code is selected, wherein up to about 239 bytes of user data may be carried in a codeword up to about 255 bytes long. According to one embodiment, a RS codeword about 255-bytes in length may be used to encapsulate about twenty-eight of the 66-bit 10 G Ethernet data blocks along with the generated redundancy data. In another embodiment, about one parity bit of the 66-bit data block from the 10 G Ethernet line coding may be dropped because the parity bit from the line coding becomes redundant with the redundancy data. In such a case, each of the resulting data blocks may be about 65 bits long and the RS codeword may encapsulate about twenty-nine of the 65-bit data blocks along with the generated redundancy data.

The process 200 may continue with the selection of a synchronization pattern at 203. The synchronization pattern may provide a fixed, known pattern that the receiver can use to find the start of each FEC codeword. The length of the synchronization pattern is a matter of design choice and may vary depending on the specific implementation. One consideration in selecting a synchronization pattern is a balance between the ease with which the start of the FEC codeword is identified and the cost of the extra bandwidth. A longer synchronization pattern will allow the receiver part of the FEC module to recognize the start of the codeword faster, but uses extra bandwidth. A shorter synchronization pattern uses bandwidth more efficiently, but the receiver may take longer to identify the codeword, especially with an increased amount of transmission errors. Another consideration in selecting the synchronization pattern is the even alignment of the FEC codeword with a transmission clock time period or interval, referred to as the time quanta. Such an embodiment avoids the need to have the overhead associated with fragmenting either the FEC codeword or the time quanta.

In one embodiment, the synchronization pattern is about 40 bits long for the RS codeword holding about twenty 66-bit data blocks of 10 G Ethernet line coding, which results in a final codeword length of about 2,016 bits. This results in about 68 bits of synchronization information (about 40 bits from the synchronization pattern and about 28 bits from the data blocks), and a ratio of the final codeword size to the data block size (sometimes referred to as a coded line rate) of about 9/8, or about 1.125. In another embodiment, the synchronization pattern is about 17 bits long for the RS codeword holding about twenty-nine 65-bit data blocks of 10 G Ethernet line coding, which results in a final codeword length of about 2,030 bits. This results in a coded line rate of about 35/32, or about 1.09375. In yet another embodiment, the synchronization pattern is about 75 bits long for the RS codeword holding about twenty-nine 65-bit data blocks of 10 G Ethernet line coding, which results in a final codeword length of about 2,088 bits. This results in a coded line rate of about 9/8, or about 1.125. In such an embodiment, up to about 6 bytes of the synchronization length may not be covered by the FEC code, but this is not an issue because the purpose of the synchronization pattern is to find the codeword so that the FEC process may begin, and correction after the fact is a moot point. Any of these synchronization patterns may make the resulting FEC codeword evenly aligned with the 16 nanosecond (ns) transmission clock time quanta that may be used in the MPCP for the 10 G PON.

Figure 3:
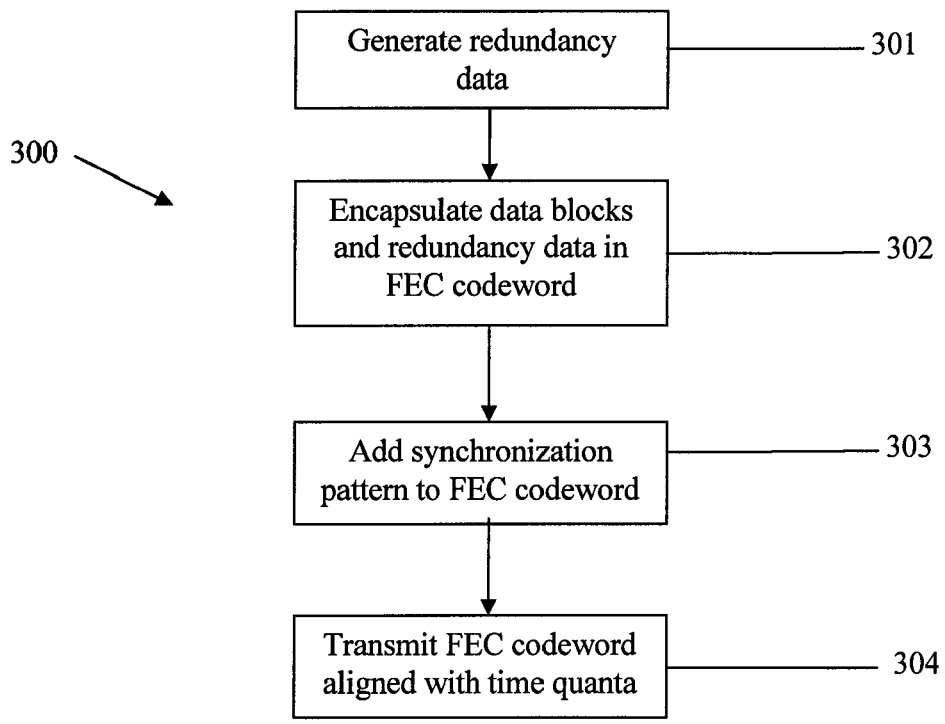
FIG. 3 is a flowchart of one embodiment of a FEC process.

FIG. 3 illustrates one embodiment of a process 300 for assembling a codeword for transmission to a recipient. The process 300 may generate redundancy data from the data blocks at 301, encapsulate the data blocks and redundancy data into an FEC codeword at 302, add a synchronization pattern to the FEC codeword at 303, and transmit the FEC codeword to a recipient at 304. The number and the order of the blocks represent only one embodiment, and the process 300 should not be limited to the number and order described herein.

The process 300 may begin with the generation of the redundancy data at 301. In an embodiment, the FEC algorithm, which may have been selected as part of the process 200, may use the original data blocks to generate the redundancy data. In one embodiment, the RS algorithm may be used to generate a plurality of polynomial data points as redundancy data. The combination of the redundancy data and the original data blocks may be referred to as an FEC payload.

The process 300 may continue with the encapsulation of the original data blocks and redundancy data into an FEC codeword at 302. The FEC codeword may be a data container with a fixed size that holds the encoded data blocks and the redundancy data. As described above, the RS codeword may accommodate up to about twenty-eight 66-bit data blocks or about twenty-nine 65-bit data blocks, depending on the choice of a specific size of the data block.

The process 300 may continue with the addition of the synchronization pattern to the FEC codeword at 303. The synchronization pattern, which may have been determined based on the process 200, may serve as a flag to mark the beginning of each FEC codeword for the recipient. The synchronization pattern may be agreed upon by both the sender part and the receiver part of the FEC module so the receiver part knows how to extract the FEC codeword. In one embodiment, the 40-bit synchronization pattern is used for a FEC payload containing the 66-bit data blocks. In another embodiment, the 17-bit synchronization pattern is used for a FEC payload containing the 65-bit data blocks. In yet another embodiment, the 75-bit synchronization pattern may be used for a FEC payload containing the 65-bit data blocks, to accommodate the need for a longer synchronization pattern.

The process 300 may continue with the transmission of the FEC codeword at 304. The FEC codeword may be transmitted to a recipient using any suitable transmission network, such as the ODN described above. In an embodiment, an integer number of FEC codewords are aligned with an integer number of time quanta without fractioning any codeword or time quanta. In one embodiment, an even number of 16 ns time quanta of the MPCP as defined for 10 G EPON is used for transmission of an integer number of 255-byte RS FEC codewords encapsulating an integer number of 66-bit data blocks. In another embodiment, an even number of 16 ns MPCP time quanta may be used for transmission of an integer number of RS 255-byte FEC codewords encapsulating an integer number of 65-bit data blocks. In 10 GB/s systems using 16 nanoseconds (ns) time quanta and 66 bit code blocks, about 20 bytes of MAC data may be transmitted per time quanta. For example, about two time quanta may contain about five 64 bit blocks of MAC data. For the 66 bit data blocks, adding about 128 bits of redundancy data and about 22 bits of synchronization pattern yields about 1,800 bits, which results in about 225 bytes per FEC codeword and the 9/8 code rate. For the 65 bit data blocks, adding about 128 bits of redundancy data and about 22 bits of synchronization pattern yields 1,775 bits, which results in about. 221.75 bytes per FEC codeword and a code rate of about 1.125.

Figure 4:
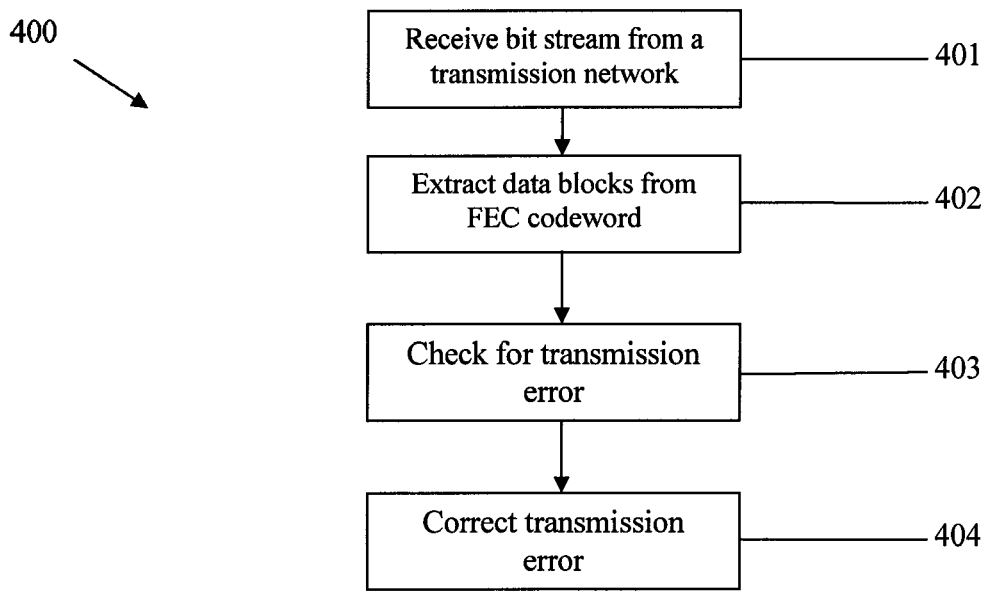
FIG. 4 is a flowchart of one embodiment of an error correction process.

FIG. 4 illustrates one embodiment of a process 400 for processing a FEC data stream. The process 400 may receive a bit stream from a network at 401, extract the data blocks from the FEC codeword at 402, check for transmission errors in the data blocks at 403, and correct the detected errors at 404. The number and the order of the blocks represent only one embodiment, and the process 400 should not be limited to the number and order described herein.

The process 400 may begin with the reception of a bit stream at 401. The reception of the bit stream may include recognition of the synchronization pattern, and/or dividing the bit stream into FEC codewords. In some embodiments, recognizing a synchronization pattern may include identifying the known synchronization pattern that marks the beginning of the FEC codeword. Because the length of the synchronization pattern and the FEC codeword are known to both the sender and receiver, dividing the bit stream into FEC codewords may include separating the synchronization pattern from the FEC codeword in the bit stream, perhaps based on the lengths of the FEC codeword and the synchronization pattern.

The process 400 may continue with the extraction of the data blocks from the FEC codeword at 402. Since the length of the redundancy data and each data block are both known, extracting a data block may include separating the redundancy data from the data block in a FEC codeword. The extracted data blocks may be about 65 or 66 bytes in length, as described above. In an embodiment, when the data blocks are about 65 bits long, the sixty-sixth parity bit may be added onto the data blocks, returning the data blocks to their original 66-byte length.

The process 400 may continue with a check for transmission errors at 403. Various types of errors may occur as data is transmitted from the sender to the receiver. For example, bits may be flipped and/or data may be corrupted in the transmission process. The redundancy data may allow the process 400 to identify and correct a transmission error. In one embodiment, the process 400 runs the received data blocks through the same FEC algorithm that the sender used to generate the redundancy data, and generates a new version of the redundancy data. The new version of the redundancy data is compared against the received version of the redundancy data and a discrepancy between the two indicates one or more transmission errors.

If errors exist in the data, the process 400 may continue with the correction of the transmission error at 404. Once a transmission error is detected and located, the original data blocks may be recovered by using a combination of the redundancy data and the FEC algorithm, depending on a specific design choice. For example, the RS polynomial data points may be used to identify the data blocks that contain errors, and correct the errors.

Figure 5:
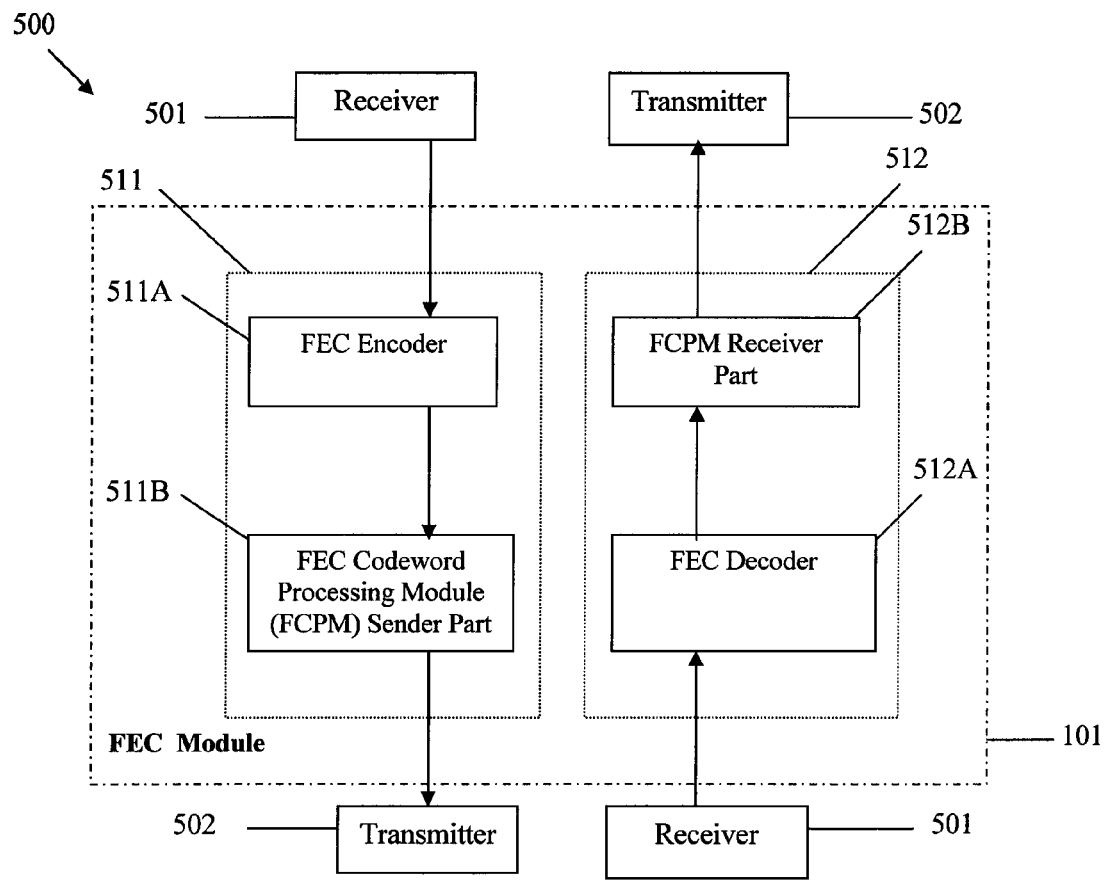
FIG. 5 illustrates one example of a PON component comprising an FEC module.

FIG. 5 shows an embodiment of the FEC module 101 as part of a network element 500, such as an OLT or an ONU in a PON. The FEC module may be coupled with other network components, including receivers 501 and transmitters 502. Persons of ordinary skill in the art will appreciate that FIG. 5 illustrates only one embodiment of the FEC module 101, and that the network component 500 may have any number of transmitters 501 and receivers 502, at least some of which may be combined into transceivers. In one embodiment, the FEC module 101 comprises an FEC module sender part 511 and an FEC module receiver part 512. In various embodiments, the sender part 511 and the receiver part 512 may be implemented as a single module or separate modules, depending on the design choice.

The FEC module sender part 511 may comprise a FEC encoder 511A and a FEC codeword processing module (FCPM) sender part 511B. The encoder 511A may implement the FEC algorithm. Specifically, the encoder 511A may be configured to receive data blocks from the receiver 501, use the FEC algorithm to generate a set of redundancy data, combine the redundancy data and the data blocks into an FEC payload, and encode the FEC payload. The FCPM sender part 511B may be related to codeword processing for the sender of the codeword. The sender part may be configured to add a synchronization pattern to the encoded FEC codeword, and align an integer number of FEC codewords with an integer number of a chosen transmission clock time quanta before the data transmission by the transmitter 502.

The FEC module receiver part 512 may comprise a FEC decoder 512A and a FCPM receiver part 512B. The FEC decoder 512A comprises the same or a similar FEC algorithm that is used by the FEC encoder 511A. The decoder 512A is configured to decode the encoded FEC codeword, extract the FEC payload, and use the FEC algorithm to generate a new version of the redundancy data for error detection. The FCPM receiver part 512B is configured to detect transmission errors and correct the detected errors. It is not necessary for the present disclosure to work in the described configuration. Alternatively, the functions embodied in the FEC processor may be combined into fewer or more components, as a matter of design choice.

Figure 6:
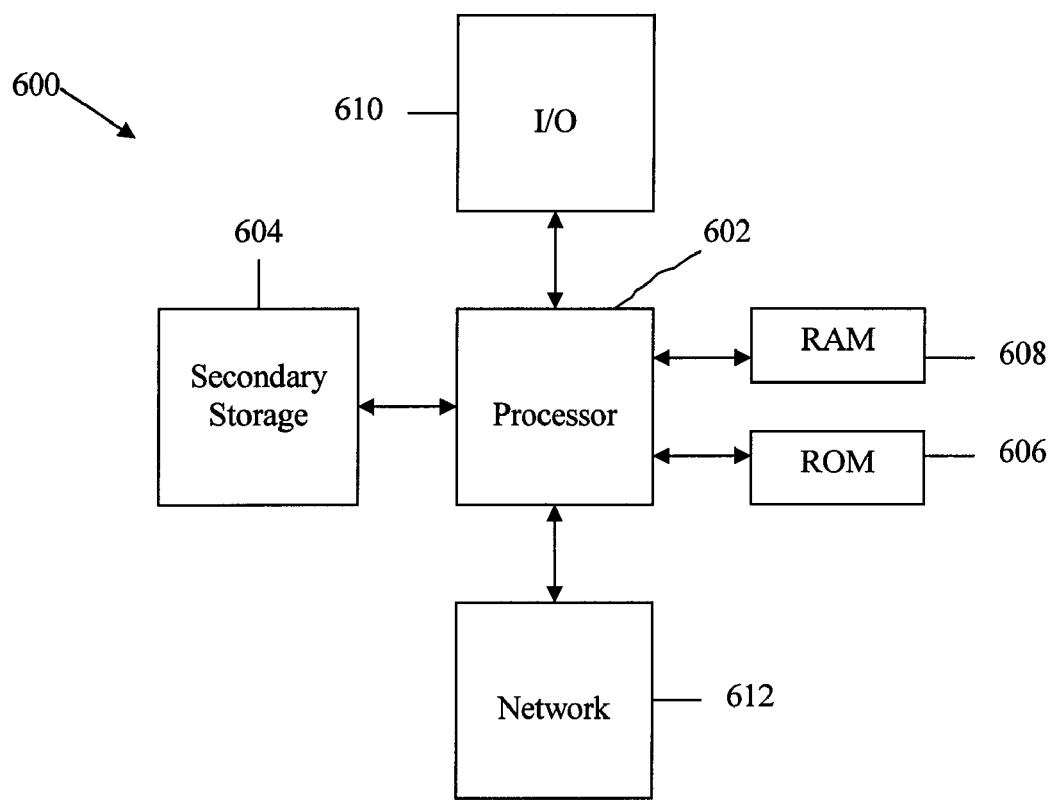
FIG. 6 illustrates an exemplary general-purpose computer system suitable for implementing the several embodiments of the disclosure.

The network components described above may be implemented on any general-purpose network component, such as a computer, network, or node, with sufficient processing power, memory resources, and network throughput capability to handle the necessary workload placed upon it. FIG. 6 illustrates a typical, general-purpose network component suitable for implementing one or more embodiments of a node disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) 610 devices, and network connectivity devices 612. The processor may be implemented as one or more CPU chips.

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage. The RAM 608 is used to store volatile data and perhaps to store instructions. Access to both ROM 606 and RAM 608 is typically faster than to secondary storage 604.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
    a processor configured to:
    apply a forward error correction (FEC) algorithm to a plurality of data blocks to generate an integer number of redundancy data;
    encapsulate an integer number of the data blocks and an integer number of the redundancy data in an FEC codeword; and
    transmit the FEC codeword, wherein the FEC codeword is evenly aligned with a transmission clock time quanta.

2. The network component of claim 1, wherein the processor is further configured to add a synchronization pattern to the FEC codeword.

3. The network component of claim 1, wherein applying the forward FEC algorithm comprises applying a Reed-Solomon (RS) coding algorithm.

4. The network component of claim 1, wherein the transmission time clock quanta is about 16 nanoseconds.

5. The network component of claim 1, wherein a ratio of a length of the codeword to the transmission rate is no more than about 1.125.

6. The network component of claim 1, wherein a ratio of a length of the codeword to the transmission rate is no more than about 1.09375.

7. The network component of claim 1, wherein each of the data blocks is about 65 bits in length and contains about 64 bits of data.

8. A method comprising:
- selecting, using a processor, a forward error correction (FEC) algorithm that generates a plurality of redundancy data from a plurality of data blocks;
- selecting an FEC codeword that encapsulates an integer number of the data blocks; and
- selecting a synchronization pattern to add to the FEC codeword such that an integer number of the FEC codewords are evenly aligned with an integer number of transmission clock time quanta.

9. The method of claim 8, wherein the codeword comprise no more than about 255 total bytes, of which no more than about 239 bytes are the data blocks.

10. The method of claim 8, wherein the FEC codeword comprises about 28 data blocks and within each data block is about 66 bits in length.

11. The method of claim 10, wherein the synchronization pattern is about 40 bits in length and the length of the codeword with the synchronization pattern is about 2016 bits.

12. The method of claim 8, wherein the codeword comprises about 29 data blocks and within each data block is about 65 bits in length.

13. The method of claim 12, wherein the synchronization pattern is about 17 bits in length and the length of the codeword with the synchronization pattern is about 2030 bits.

14. The method of claim 11, wherein the synchronization pattern is about 75 bits in length and the length of the codeword with the synchronization pattern is about 2088 bits.

15. A passive optical network (PON) component comprising:
- a forward error correction (FEC) module for coupling to a transmitter and a receiver, wherein the FEC module is configured to generate an FEC codeword that encapsulates an integer number of data blocks and promote an alignment of an integer number of FEC codewords with an integer number of a transmission clock time quanta.

16. The PON component of claim 15, wherein the FEC module comprises:
- an FEC encoder for coupling to the receiver, wherein the FEC encoder is configured to receive data blocks from the receiver, generate a redundancy data, and encode the redundancy data and the data blocks into an FEC payload into an FEC codeword, and
- an FEC codeword processing module (FCPM) coupled to the FEC encoder and for coupling to the transmitter, wherein the FCPM is configured to add a synchronization pattern the FEC codeword and ensure that an integer number of FEC codewords are evenly aligned with an integer number of the transmission clock time quanta.

17. The PON component of claim 16, wherein the FEC module further comprises:
- a FEC decoder for coupling to the receiver, wherein the FEC decoder is configured to extract the data blocks and redundancy data from the FEC codeword and generate a new version of the redundancy data for error detection, and
- wherein the FCPM is further configured to detect transmission errors and correct the transmission errors.

18. The PON component of claim 17, wherein the FEC encoder and the FEC decoder are integrated in a single device.

19. The PON component of claim 17, wherein the FEC encoder, the FEC decoder, and the FCPM are integrated in a single device.

20. The PON component of claim 15, wherein the PON component is part of one of an optical network terminal (ONT) or an optical line termination (OLT) in an Ethernet PON.

21. An apparatus comprising:
- a 64 bit/66 bit (64 B/66 B) encoder that produces 66 bit blocks; and
- a forward error correction (FEC) encoder that: accumulates 27 of the 66 bit blocks to form the basis of an FEC codeword;
- removes a redundant first bit of each block of the 27 bit blocks;
- FEC-encodes a payload portion of the FEC codeword, which results in a parity portion of the codeword, wherein the payload portion of the FEC codeword includes the 27 bit blocks with the redundant first bit of each block removed;
- combines the payload portion and the parity portion to form a 255-octet Reed-Solomon codeword.

* * * * *

UNITED STATES PATENT AND TRADEMARK OFFICE
CERTIFICATE OF CORRECTION

PATENT NO.         : 8,122,325 B2
APPLICATION NO.    : 11/765637
DATED              : February 21, 2012
INVENTOR(S)        : Frank J. Effenberger Page 1 of 1

It is certified that error appears in the above-identified patent and that said Letters Patent is hereby corrected as shown below:

Title Page: Item 57, Abstract, Line 11. Change "EEC" to "FEC."

Column 10: Claim 16, Line 6. Add "to" after pattern.

Signed and Sealed this
Tenth Day of April, 2012

David J. Kappos
*Director of the United States Patent and Trademark Office*